(12) United States Patent
Yamaguchi et al.

(10) Patent No.: US 7,233,995 B2
(45) Date of Patent: Jun. 19, 2007

(54) METHOD AND DEVICE FOR CONNECTING NETWORKS

(75) Inventors: Kohei Yamaguchi, Chiba (JP); Yasubumi Chimura, Kanagawa (JP); Tsuneyuki Sakano, Kanagawa (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 556 days.

(21) Appl. No.: 10/121,684

(22) Filed: Apr. 15, 2002

(65) Prior Publication Data
US 2002/0161899 A1    Oct. 31, 2002

(51) Int. Cl.
*G06F 15/16* (2006.01)

(52) U.S. Cl. ............... 709/227; 709/228; 709/238; 709/245

(58) Field of Classification Search ......... 709/227, 709/223, 228, 245, 219, 217, 238, 230
See application file for complete search history.

(56) References Cited

U.S. PATENT DOCUMENTS

| | | | |
|---|---|---|---|
| 6,006,272 A * | 12/1999 | Aravamudan et al. | 709/245 |
| 6,360,265 B1 * | 3/2002 | Falck et al. | 709/227 |
| 6,389,462 B1 * | 5/2002 | Cohen et al. | 709/218 |
| 6,480,508 B1 * | 11/2002 | Mwikalo et al. | 370/475 |
| 6,493,765 B1 * | 12/2002 | Cunningham et al. | 709/245 |
| 6,618,757 B1 * | 9/2003 | Babbitt et al. | 709/226 |
| 6,628,943 B1 * | 9/2003 | Agrawal et al. | 455/432.1 |
| 6,629,137 B1 * | 9/2003 | Wynn | 709/223 |
| 6,654,366 B1 * | 11/2003 | Ketcham | 370/352 |
| 6,731,642 B1 * | 5/2004 | Borella et al. | 370/401 |
| 6,738,390 B1 * | 5/2004 | Xu et al. | 370/467 |
| 6,779,035 B1 * | 8/2004 | Gbadegesin | 709/228 |
| 6,781,982 B1 * | 8/2004 | Borella et al. | 370/352 |
| 6,892,245 B1 * | 5/2005 | Crump et al. | 709/245 |
| 6,937,612 B1 * | 8/2005 | Mauger et al. | 370/465 |

FOREIGN PATENT DOCUMENTS

| | | |
|---|---|---|
| EP | 1 098 496 A2 | 5/2001 |
| WO | WO98/40990 | 9/1998 |
| WO | WO99/38303 | 7/1999 |

OTHER PUBLICATIONS

"Internet Transparency" Memo:RFC 2775, Feb. 2000; B. Carpenter, Network Working Group; IBM; pp. 1-19.
"Firewalls, Network Address Translators (Nats), and H. 323, Joon Maeng, Chief Scientist, VTEL Corp.; Oct. 11, 2000; pp. 1-19 (Internet Article).

* cited by examiner

*Primary Examiner*—Saleh Najjar
*Assistant Examiner*—Faruk Hamza
(74) *Attorney, Agent, or Firm*—Rabin & Berdo, P.C.

(57) ABSTRACT

It is the subject of this invention to provide a method and a device that can process communications between all sorts of multi-media terminals.

The method or device of this invention is applied or equipped between different multi-media terminals, each of which exists in each different address space. It watches packets under each communication protocol. It automatically compiles and deletes address information for address translation. And it stands proxy for calling and connecting between each multi-media terminal and the other multi-media terminal according to this address information.

19 Claims, 9 Drawing Sheets

METHOD AND DEVICE FOR CONNECTING NETWORKS

BACKGROUND OF THE INVENTION

1. Field of the Invention

The present invention relates to a method and a device for connecting networks each of which can be used for communications between all kinds of multi-media terminals, and in particular a method and a device for connecting networks each of which is beneficial to the kind of machines for calling and connecting terminals, which exist among different multi-media communication networks given different address spaces.

2. Description of Related Art

Recently, there is an explosion of business activities taking place on the Internet. As vast numbers of corporate networks are now connected to the Internet, IP address depletion and scaling are becoming the most compelling problems. So the solutions to these problems are being developed.

There has been published some technical documents about above-mentioned solutions to be disclosed hereinafter, which are RFC1631 The Ip Network Address Translator (NAT),RFC2319 Load Sharing Using IP Network Address Translation (LSNAT),ITU-T H323 Packet Based Multi-media Communication Systems, and RFC2543 Session Initiation Protocol (SIP).

The most adequate short-term solution to solve the IP address problems mentioned above is to reuse addresses in the different domains (cf. RFC1631). Thus each domain is given a different address space which is different from the other domains. However, there should be the case that a terminal in a domain given an address space would like to communicate with another terminal in another domain given another address space.

By the way, in the conventional IP network, such devices as NAT (Network Address Translator) or NAPT (Network Address Port Translation) have been used for the IP packets transferring between different address spaces.

NAT and NAPT devices are located at the edge of the address space, and change addresses, either statically or dynamically, for the IP packets transferring to the different address space. NAT device translates one internally-used IP address to one globally unique IP address. In contrast to this, NAPT device multiplexes transport layer identifiers of internal hosts into the transport identifiers of the single assigned external address.

Hereinafter, I would like to explain the address transfer method of NAT device by means of looking up its sequence in FIG. 11, as an example of the conventional address transfer method.

In FIG. 11, the terminal A in the address space A is given a private IP address "10.1.1.1" in that address space A, and on the other hand the terminal B in the address space B is given a global IP address "13.1.1.1" in that address space B.

There are registered to NAT some global IP addresses. One of these addresses is "13.1.1.10" for example. Private IP address of address space A should be transferred by the NAT device to this or other global address (See FIG. 11, T1).

On this condition, as terminal A sends a packet which has IP address "13.1.1.1" toward terminal B (FIG. 11,T2), NAT compiles an IP address transfer table which relates IP address "10.1.1.1" of the packet sender to IP address "13.1.1.10" for transfer assigned in the address space B as mentioned above (T3). After this, NAT translates IP address "10.1.1.1" of the packet sender to "13.1.1.10" and sends the packet toward IP address "13.1.1.1" (T4,T5).

Terminal B receives the packet and processes the data in the packet for the sender. When reply packets are demanded by the sender, the terminal B sends packets in reply toward the address "13.1.1.10" of the sender contained in the received packet. Such packets in reply reaches NAT. And NAT refers to IP address transfer table compiled by the manner mentioned above, so as to translate IP address "13.1.1.10" to IP address "10.1.1.1" of the destination (T7). After this, NAT sends the packet to the address space A(that is to say the network given the address space A) (T8).

However, NAT or NAPT only changes IP address of the OSI's third layer. That is to say, NAT or NAPT does not transfer addresses existing beyond the third layer of the multi-media communication protocol for example H323 or SIP (Session Initiation Protocol). So, it was impossible to have telephone communications between the terminals each of which was existing in the different address space.

And, NAT or NAPT needs manual initial registration before translating addresses (See FIG. 11,T1). So, there was also another subject that the operations to use these devices were complicated.

SUMMARY OF THE INVENTION

It is therefore an object of the present invention to provide a method and a device each of which is capable of communicating between all sorts of multi-media terminals, which exist among different multi-media communication networks given different address spaces, for example, private address and global address, IPV4 and IPV6, and so on.

According to one aspect of the present invention, there is provided a network connecting method that processes communications between the first multi-media terminal in the first address space and the second multi-media terminal in the second address space being distinguished from said first address space.

This network connecting method is preferably comprised of the next steps. The first is the step of corresponding the address of the first multi-media terminal in the first address space with the address of the proxy device in the second address space, and also corresponding the address of the second multi-media terminal in the second address space with which the first multi-media terminal in the first address space would like to communicate, with the address of the proxy device in the first address space.

The second is the step of translating the address of the proxy device in the first address space to the address of the second multi-media terminal in the second address space, and also translating the address of the first multi-media terminal in the first address space to the address of the proxy device in the second address space.

The third is the step of translating the address of the proxy device in the second address space to the address of the first multimedia terminal in the first address space, and also translating the address of the second multi-media terminal in the second address space to the address of the proxy device in the first address space.

And the fourth is the step of separating the address of the first multi-media terminal in the first address space from the address of the proxy device in the second address space, and also separating the address of the second multi-media terminal in the second address space from the address of the proxy device in the first address space.

According to another aspect of the present invention, there is provided a network connecting proxy device that is equipped for communications between the first multi-media terminal in the first address space and the second multi-media terminal in the second address space being distinguished from said first address space.

This network connecting proxy device is preferably comprised of the next parts.

The first is an address corresponding table that corresponds the address of the first multi-media terminal in the first address space with the address of the proxy device in the second address space.

And also corresponds the address of the second multi-media terminal in the second address space with which the first multi-media terminal in the first address space would like to communicate, with the address of the proxy device in the first address space.

And the second is an address translator that translates addresses in accordance with said address corresponding table.

The first translation is to translate the address of the proxy device in the first address space to the address of the second multi-media terminal in the second address space, and the address of the first multi-media terminal in the first address space to the address of the proxy device in the second address space when packets are sent.

And second translation is to translate the address of the proxy device in the second address space to the address of the first multi-media terminal in the first address space, and the address of the second multi-media terminal in the second address space to the address of the proxy device in the first address space when packets are received.

Since the method and device according to this invention employ above-mentioned address translating, it has become possible that two multi-media terminals in different address spaces communicate with each other.

In other words, according to present invention, a method and a proxy device can be provided, which can process communications between all sorts of multi-media terminals in multi-media communication networks existing in different address spaces.

BRIEF DESCRIPTION OF THE DRAWINGS

The present invention will be understood more fully from the detailed description given hereinafter, taken in conjunction with the accompanying drawings.

DESCRIPTION OF THE PREFERRED EMBODIMENTS

The network connecting method and proxy device of the preferred embodiments according to the present invention will be now described with reference to the accompanying drawings hereinafter.

<First Embodiment>

1. Structure of the First Embodiment

Figure 2:
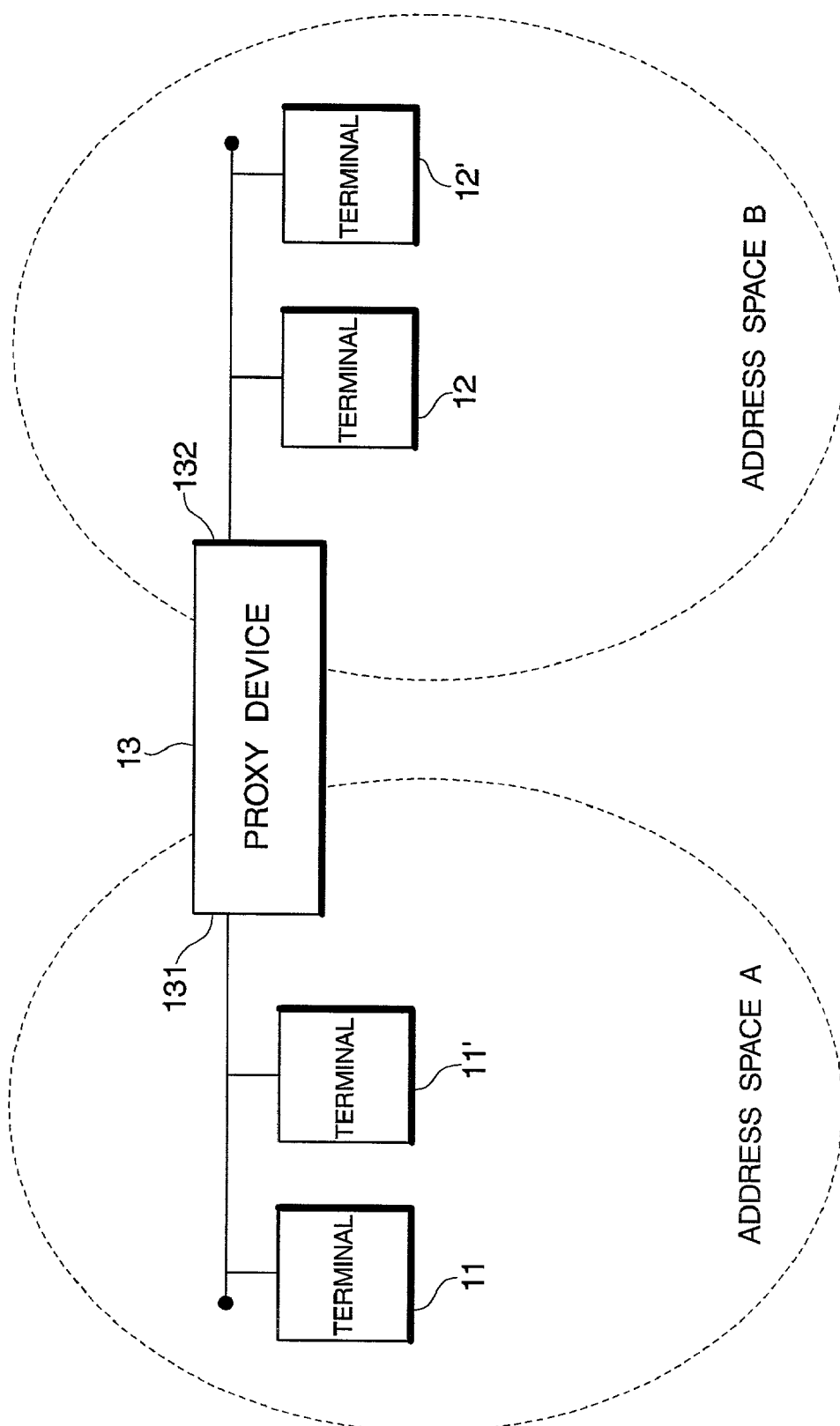
FIG. 2 is a block diagram showing the location of the proxy device among multi-media communication networks according to the first embodiment.

FIG. 2 is a block diagram showing the location of the proxy device of the first embodiment among multi-media communication networks.

In FIG. 2, the reference symbol "11" or "11'" denotes the multi-media terminals A which is in the address space A (that is to say the network with the address space A). On the other hand, the reference symbol "12" or "12'" denotes the multi-media terminals B which is in the address space B (that is to say the network with the address space B). These address spaces A and B are different address spaces, for example, the spaces of the private address and the global address, the spaces of the IPV4 and IPV6.

The proxy device 13 of the first embodiment has a network-interface 131 which faces address space A, and a network-interface 132 which faces address space B. And it stands proxy for the multi-media terminal B in the face of the address space A, on the other hand, it stands proxy for the multi-media terminal A in the face of the address space B.

Figure 1:
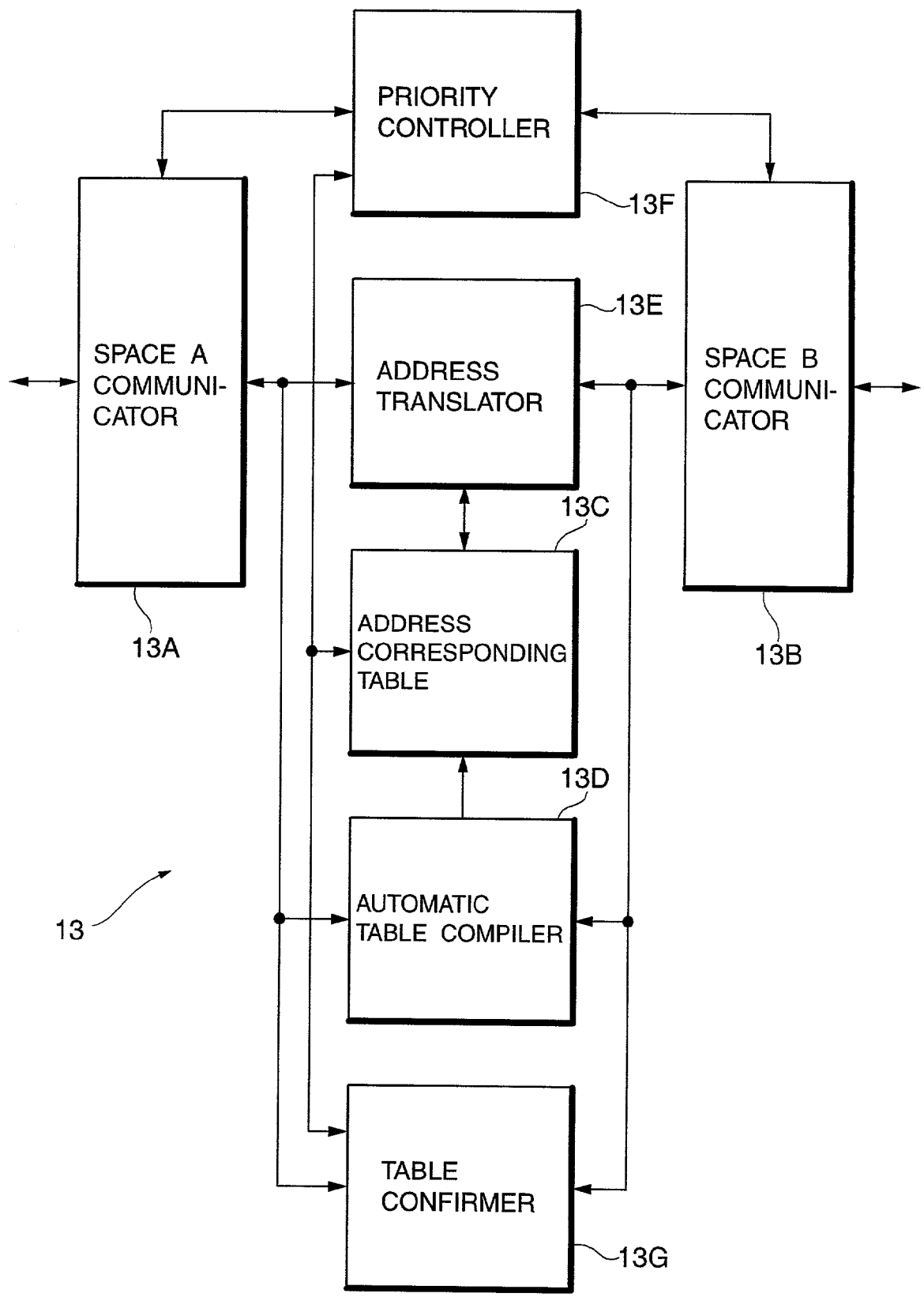
FIG. 1 is a block diagram showing the function of the proxy device according to the first embodiment.

According to FIG. 1, proxy device 13, about its function, has a space-A-communicator 13A that is to say a communication processor which processes the communications in the address space A (the network with the address space A), similarly, a space-B-communicator 13B which processes the communications in the address space B (the network with the address space B), automatic table compiler 13D which automatically compiles the address corresponding table 13C, and address translator 13E which translates addresses in accordance with the compiled address corresponding table 13C.

And, proxy device 13 also has a priority controller 13F which controls the priority of the received packet for data processing, a table confirmer 13G which confirms that the address corresponding table 13C automatically compiled is reasonable to exist or not at each moment.

2. Operation of the First Embodiment

Figure 3:
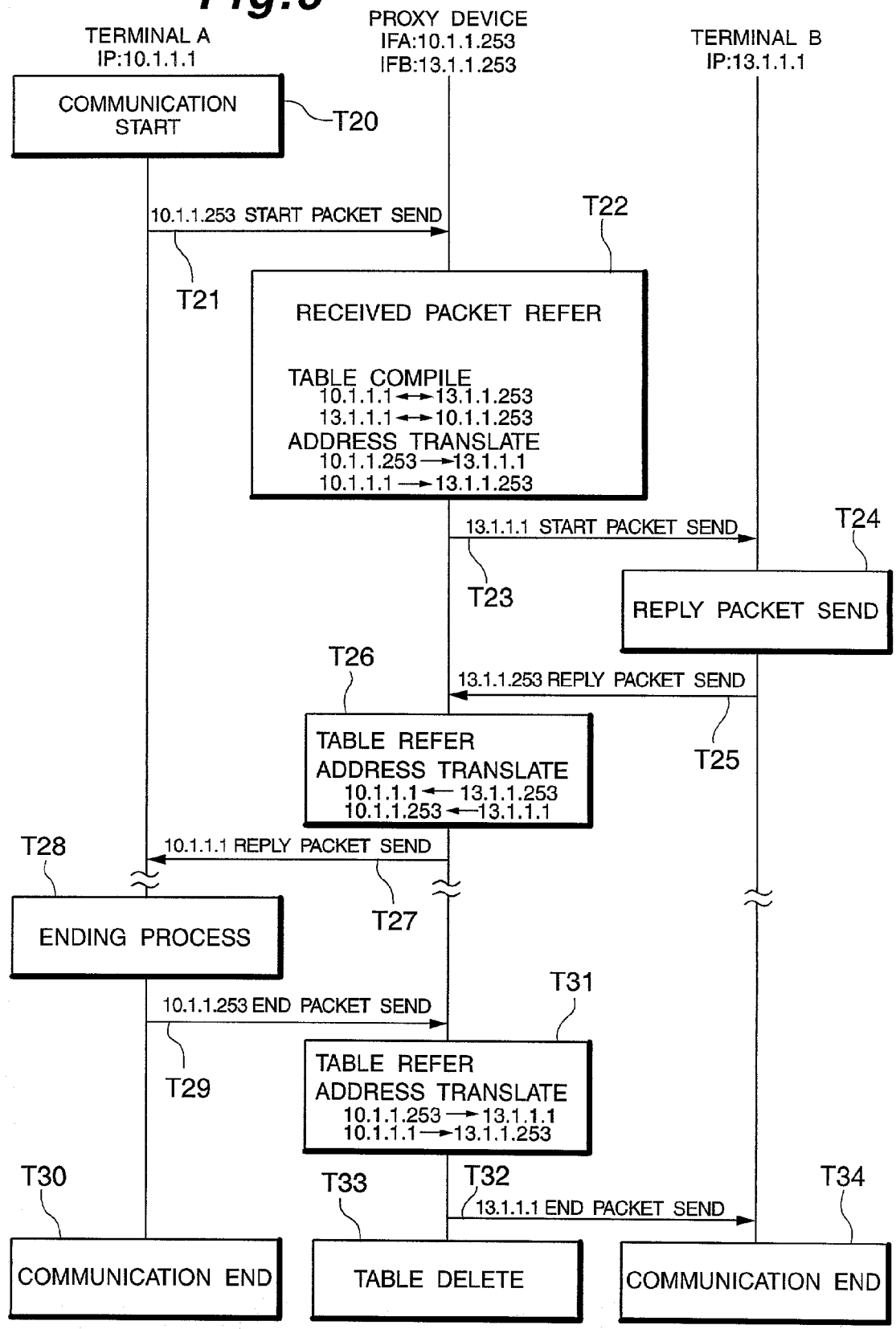
FIG. 3 is a sequence chart showing the operation of the calling and connecting from one multi-media terminal to the proxy device of the first embodiment; and from the proxy device to the other terminal.

Next, the operation of the proxy device 13 of the first embodiment will be described below referring to FIG. 3. This is the operation in the case that multi-media terminal 11 (or 11') in the address space A makes a call and multi-media terminal 12 (or 12') in the address space B receives the call.

In this description, multi-media terminal 11 will be assigned IP address "10.1.1.1", multi-media terminal 12 will be assigned IP address "13.1.1.1", network interface 131 will be assigned IP address "10.1.1.253", and network interface 132 will be assigned IP address "13.1.1.253".

And, in multi-media terminal 11, there is in advance registered IP address "10.1.1.253", which belongs to network interface 131 of proxy device 13 as a destination gate way to communicate with the other multi-media terminal existing in the other address space. On the other hand, in multi-media terminal 12, there is in advance registered IP address "13.1.1.253", which belongs to network interface 132 of proxy device 13 as a destination gate way to communicate with the other multi-media terminal existing in the other address space.

Multi-media terminal 11 in need of the communication with multi-media terminal 12 sends a communication start packet (calling and connecting packet) the destination IP address "13.1.1.1" originally assigned to multi-media terminal 12, contained in its data area, toward network interface 131 of proxy device 13 which is a gate way to IP address "13.1.1.1" and which IP address "10.1.1.253"(T20, T21).

Proxy device 13 looks up IP address of destination multi-media terminal 12 from communication start packet (calling and connecting packet) which is sent by calling multi-media terminal 11 and which obeys to multi-media communication protocol. And this device automatically makes address corresponding table 13C. After this, this device set destination address to IP address "13.1.1.1" of multi-media terminal B, source address to IP address "13.1.1.253" of network interface 132 of proxy device 13, to send the communication start packet (T22).

More definitely, operations about automatic compiling of address corresponding table 13C and address translation by proxy device 13 will be described as follows.

First, proxy device 13 recognizes IP address "10.1.1.1" of source multi-media terminal 11 from the communication start packet received.

Second, proxy device 13 recognizes original IP address "13.1.1.1" of destination multi-media terminal 12 from the communication start packet.

Third, proxy device 13 automatically compiles address corresponding table 13C which corresponds IP address "10.1.1.1" of source multi-media terminal 11 to IP address "13.1.1.253" of network interface 132 in the other address space B being different from the source address space A, and which corresponds IP address "13.1.1.1" of the original multi-media terminal 12 to IP address "10.1.1.253" of network interface 131 in the source address space A.

Fourth, proxy device 13 translates all the IP address indicating the destination and the source contained in the IP header area and the data area of the communication start packet, according to IP address correspondence of the address corresponding table 13C automatically compiled.

As described above, communication start packet which IP address being translated is sent to the address space B (the network in the address space B). This packet reaches to the multi-media terminal 12 (T23). In this case, destination address in the header area of the packet is set to IP address "13.1.1.1" of multi-media terminal B, and source address there to IP address "13.1.1.253" of network interface 132.

Multi-media terminal 12 processes the decision whether it can reply to the request for calling and connecting or not and so on (T24). After this process, compile and send reply packet which express OK or N.G. for the calling and connecting request, with destination IP address "13.1.1.253" and source address "13.1.1.1".

By this, proxy device 13 translates, with reference to the address corresponding table 13C compiled as mentioned above, all the IP address of the destination and the source contained in the IP header and data area of the reply packet received by the device (T26). After this translation, this device sends the reply packet to the address space A (which belongs to the network), which reaches to the multi-media terminal 11 (T27). The IP header of the reply packet from proxy device 13 to multi-media terminal 11 has a destination IP address "10.1.1.1" and a source IP address "10.1.253".

If the contents of the reply packet has the meaning of OK for communication, the calling settles. After this, multi-media terminal 11 in the address space A and multi-media terminal 12 in the address space B communicate with each other by packets via proxy device 13. In this case, if proxy device 13 receives a packet from multi-media terminal 11 or 12, it translates all the IP address of the destination and the source contained in the IP header and the data area of the packet received, in accordance to the address correspondence of the address corresponding table 13C compiled mentioned above. And sends the packet to the destination address space (which belongs to the network).

As mentioned above, when multi-media terminal 11 in the address space A and multi-media terminal 12 in the address space B communicate with each other, multi-media terminal 11 settles communication with the interface of the proxy device 13, on the other hand, multi-media terminal 12 settles communication with the network interface 132 of the proxy device 13. Thus, multi-media terminal 11 and multi-media terminal 12 settle communication via proxy device 13.

When the communication ends, one of the multi-media terminals communicating with each other sends the communication end packet (calling disconnecting packet) in accordance to the multi-media communication protocol. FIG. 3 is showing the case that the multi-media terminal 11 sends communication end packet (T28, T29). Multi-media terminal 11 which sent a communication end packet, ends the communication by this sending(T30).

Proxy device 13 which received communication end packet, similarly as mentioned above, translates IP address and sends the communication end packet toward the other multi-media terminal 12 (T31,T32). And proxy device 13, after this sending, automatically delete the contents of the address corresponding table concerning this communication end packet(T33).

Multi-media terminal which has received communication end packet ends the communication at this reception moment (T34).

Figure 4:
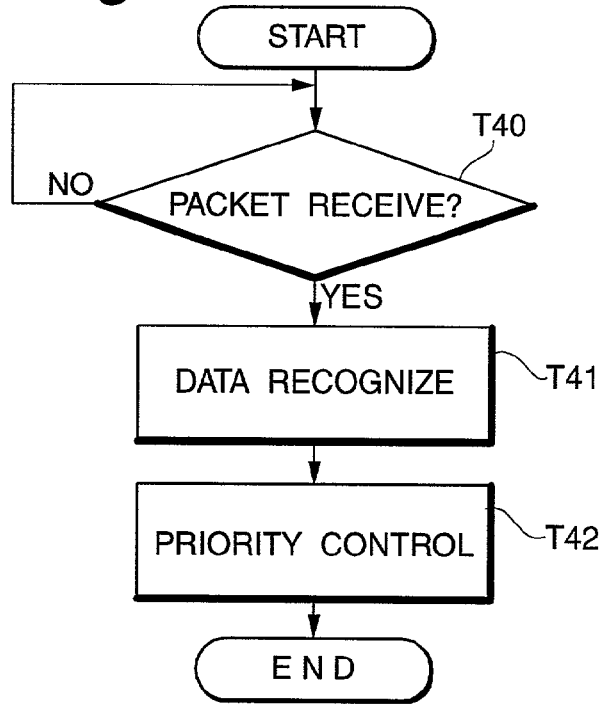
FIG. 4 is a flow chart showing the operation of the calling and connecting concerning proxy device given priority of the first embodiment.

Next, the controlling operation of the procession about priority connection will be described referring to the flow-chart of FIG.4, which is about received packets, and which is processed by priority controller 13F in proxy device 13.

As proxy device 13 has compiled address corresponding table 13C, it has the function to watch packets between multi-media terminals. So, when packets are received by proxy device 13 (T40), priority controller 13F of the proxy device 13 judges the kind of the packets from the port number of the received packets(T41), and processes priority connection according to the characteristics of the packets (T42). For example, sound packets should be sent prior to picture packets, for people are worried by the delay of the voice from the person talking with, otherwise not worried by the delay of the motion of his figure.

In addition, space-A-communicator 13A and space-B-communicator 13B have receiving buffers in them respectively, space-A-communicator 13A, address translator 13D and space-B-communicator 13B process to send received packets under this priority control.

Next, the confirming operation about address corresponding table 13C will be described referring to the flowchart of FIG. 5, which is processed by table confirmer 13G in proxy device 13. This is the confirmation whether address corresponding table 13C automatically compiled is reasonable to exist at any one moment or not.

Figure 5A:
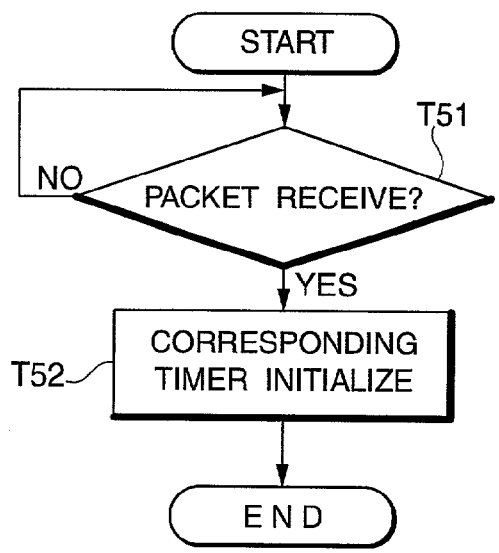
FIG. 5 is a flow chart showing the operation of the confirmation by the proxy device with address correspondent table of the first embodiment.

Table confirmer 13G in proxy device 13, as shown in FIG. 5(A), has a function of detecting silent situation of sound packets or necessary image data absence of picture cell packets, for example, the absence of the person's image talking with (T51). And, it also has a function of measuring the period of these meaningless packet's detection (T52). With these functions, proxy device 13 can detect the period of exchanging meaningless packets. In addition, a function of measuring period is processed by the clock at any time. And it starts again at the moment of the reception of the necessary packet.

Figure 5B:
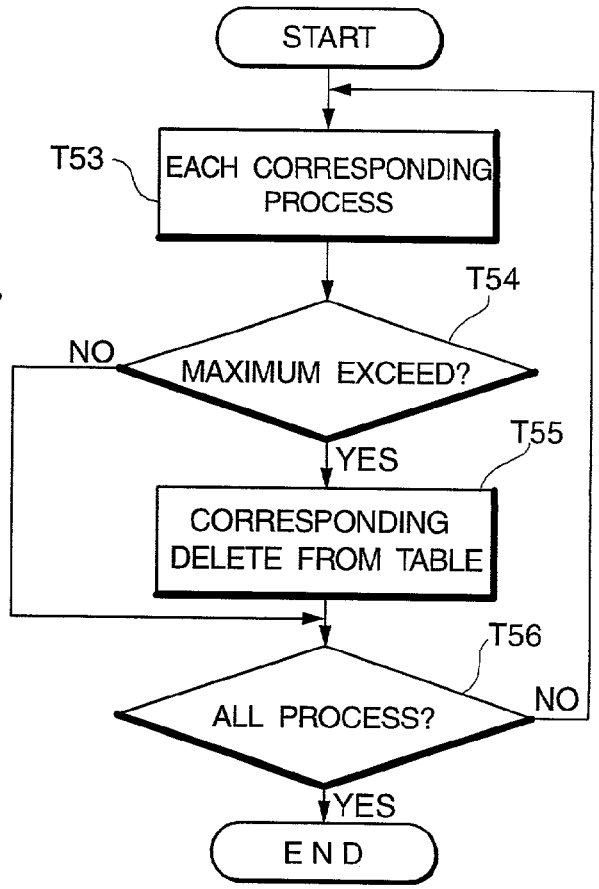

The operation of the watching(FIG. 5(B)) starts processing periodically. In this operation, taking out an address corresponding one by one(T53), proxy device 13 judges whether the measured period exceeds the maximum value which the network manager set in advance(T54). If it exceeds, proxy device 13 disconnects the connection which is timed out, and delete the address corresponding to renew the address corresponding table 13C (T55). It does these processes about all the address correspondings contained in address corresponding table 13C (T56).

3. Effects of the First Embodiment

As mentioned above, according to the first embodiment, when the communication is processed between all sorts of multi-media terminals existing in the different address spaces, the proxy device existing at the edges of the address spaces stands proxy for each other multi-media terminal existing in the different address space to communicate, it settles each communication in each address space. Consequently, in the networks with different address spaces the communication which was impossible by neither NAT nor NAPT has become possible.

Moreover, according to the first embodiment, in the method of IP address translation as the address corresponding table is automatically compiled with the IP addresses of the communication packet and the network interface parts of the proxy device 13, it has become needless to assign and register the IP addresses to be used for the global communications in advance, so the problem of complicated operation has been solved.

Besides, according to the first embodiment, in the example of FIG. 2 when more than one multi-media terminals 11,11' or 12,12' exist in each address space A or B, the multi-media terminals 11,11' in the address space A only use common IP address belonging to network interface 132 of the proxy device 13 so as to connect with the multi-media terminals 12 or 12' in the address space B. And, the multi-media terminals 12,12' in the address space B only use common IP address belonging to network interface 131 of the proxy device 13 so as to connect with the multi-media terminals 11 or 11' in the address space A. Consequently, this can prevent us from wasting IP addresses.

And moreover, according to the first embodiment, proxy device 13 can watch packets and recognize the priority under multi-media communication protocol. So, it has become possible to control packets transferring according to the priority.

And besides, according to the first embodiment, proxy device 13 itself can judge the adequacy about the existence of the address corresponding table 13C automatically compiled.

<Second Embodiment>

Next, the second embodiment of the proxy device by present invention will be now described referring to the drawings.

Proxy device of the second embodiment is applied to the case that H323 multi-media terminals are kept by different gate keepers under H323 protocol in different address spaces.

1. Structure of the Second Embodiment

Figure 6:
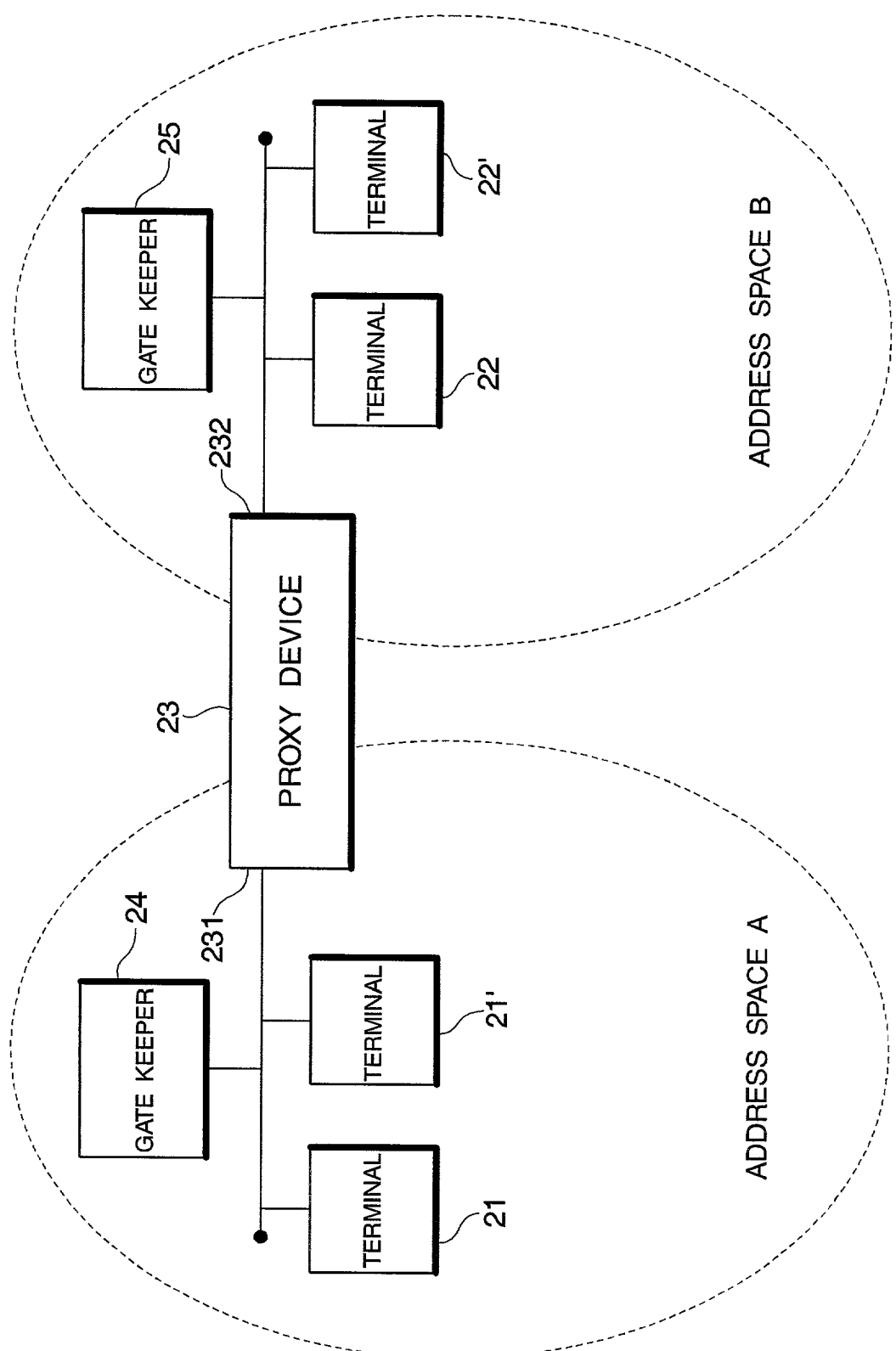
FIG. 6 is a block diagram showing the location of the proxy device among multi-media communication networks according to the second embodiment.

FIG. 6 is a block diagram showing the location of the proxy device of the second embodiment among multi-media communication networks.

In FIG. 6, the reference symbol "21" (or "21'") denotes the H323 multi-media terminal A which is in the address space A (which belongs to the network). On the other hand, the reference symbol "22" (or "22'") denotes the H323 multi-media terminal B which is in the address space B (which belongs to the network). In this second embodiment, it is similar to the first embodiment that these address spaces A and B are different address spaces, for example, the spaces of the private addresses and the global addresses, the spaces of the IPV4 and IPV6.

The proxy device of the second embodiment has a network-interface 231 (address space A gate way address) which faces address space A, and a network-interface 232 (address space B gate way address) which faces address space B.

In the case of the second embodiment, gate keeper 24 (gate keeper A) is equipped in the address space A, it controls the communications between the H323 multi-media terminals existing in the address space A. And, gate keeper 25 (gate keeper B) is equipped in the address space B, it controls the communications between the H323 multi-media terminals existing in the address space B As proxy device 23 of the second embodiment is comprised as similar to proxy device 13 of the first embodiment, the description of it is omitted.

2. Operation of the Second Embodiment

Figure 7:
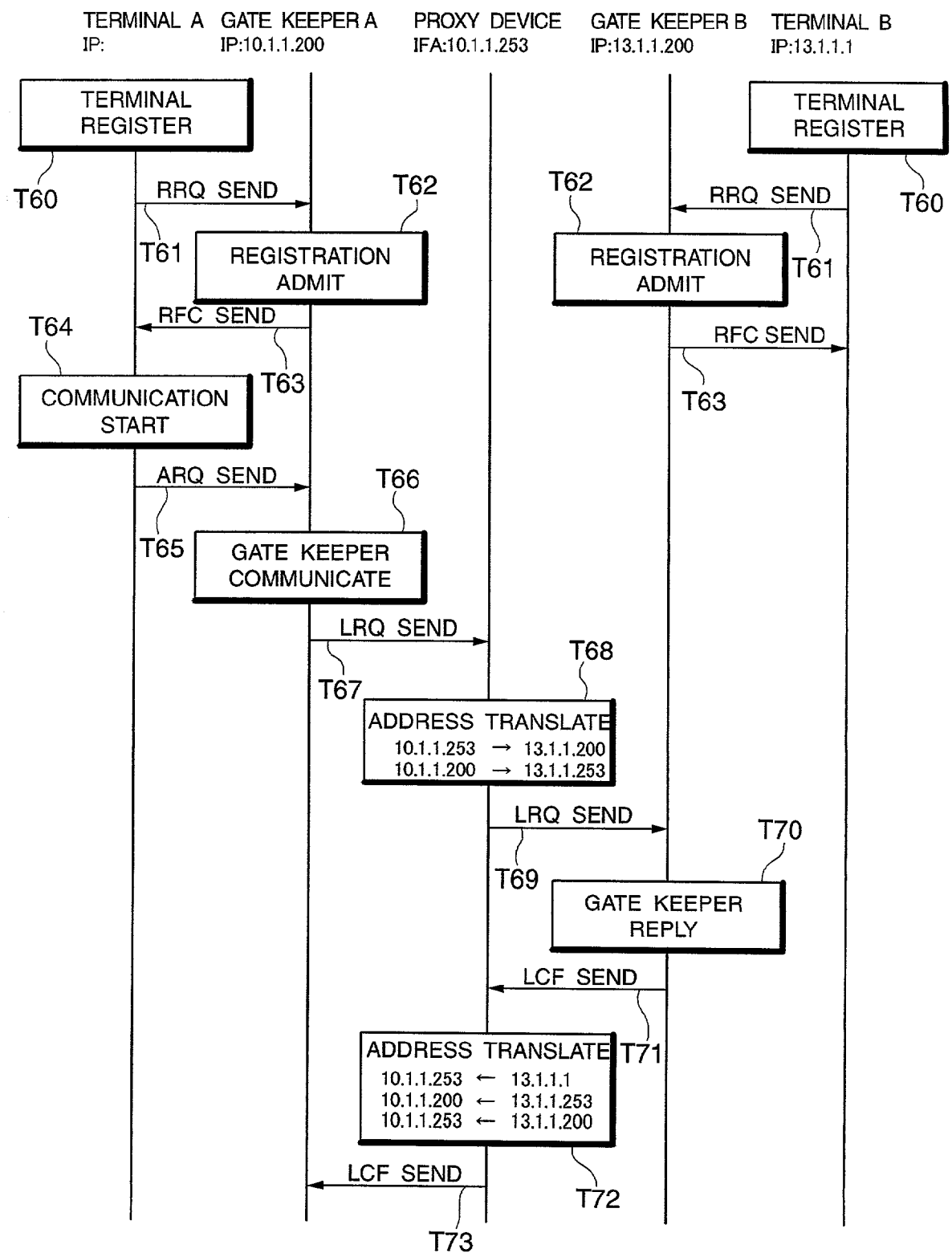
FIG. 7 is the first part of a sequence chart showing the operation of the calling and connecting from one multi-media terminal to the proxy device of the second embodiment; and from the proxy device to the other terminal.
Figure 8:
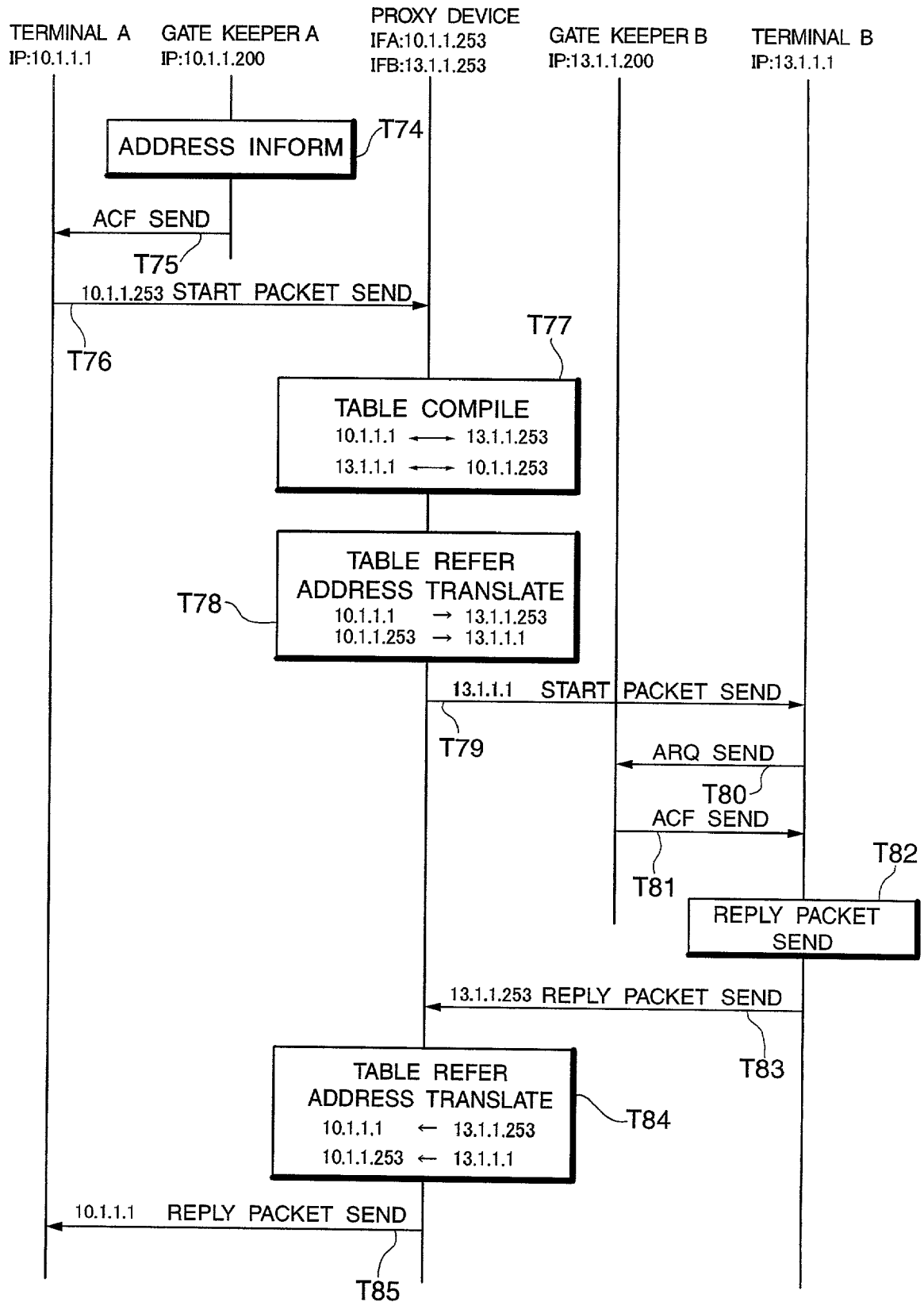
FIG. 8 is the second part of a sequence chart showing the operation of the calling and connecting from one multi-media terminal to the proxy device of the second embodiment; and from the proxy device to the other terminal.

Next, the operation to settle the calling from H323 multi-media terminal 21 (terminal A) to H323 multi-media terminal 22 (terminal B) will be described, referring to the sequence chart of FIG. 7 and FIG. 8.

In addition, before the communication starts, it is necessary for H323 multi-media terminal 21 to register its IP address and so on, in the gate keeper 24 to which it belongs. And it is necessary for H323 multi-media terminal 22 to register its IP address and so on, in the gate keeper 25 to which it belongs.

That is, H323 multi-media terminal 21 in need of terminals registration sends RRQ packet (registration request packet) to gate keeper 24 in the same address space A, and gate keeper 24 allows the registration and reply RCF packet (registration confirm packet) to H323 multi-media terminal 21 (T60~T63), thus registration is processed.

H323 multi-media terminal 22 in the address space B registers to gate keeper 25 similarly (T60~T63).

On the other side, gate keeper 24 has a function that when received the request for connecting to the H323 multi-media terminal not registered in gate keeper 24, it inquires to other gate keepers whether the requested H323 multi-media terminal registered or not by sending LRQ packet (location request packet). In this occasion, in gate keeper 24, as a destination of LRQ packet, there is IP address "10.1.1.253" of network interface 231 set in advance, which is being connected to address space A.

And, gate keeper 25 has a similar function, so, in gate keeper 25, as a destination of LRQ packet, there is IP address "13.1.1.253" of network interface 232 set in advance, which is being connected to address space B.

In proxy device 23, as IP address of the gate keeper, there are registered IP address "10.1.1.200" of gate keeper 24 and IP address "13.1.1.200" of gate keeper 25.

H323 multi-media terminal 21 in need of communications with H323 multi-media terminal 22 sends ARQ packet (admission request packet) toward the registered gate keeper 24 (T64,T65). That is, H323 multi-media terminal 21 inquires of the registered gate keeper 24 getting the address to use and calling for connecting, so as to control the communication with the original destination H323 multi-media terminal 22.

Gate keeper 24 recognizes that there are not H323 multi-media terminal 22 that is the original calling accepted terminal. So, then it sends LRQ packet (location request packet) to proxy device 23. Proxy device 23 translates destination IP address "10.1.1.253" of the received LRQ packet to IP address "13.1.1.200" of gate keeper 25, and translates source IP address "10.1.1.200" of the received LRQ packet to IP address "13.1.1.253" of network interface 232 connected to the address space B of proxy device 23, then sends it to gate keeper 25 of the other address space B.

Gate keeper 25 which has received LRQ packet from proxy device 23 sends LCF packet (location confirm packet) toward network interface 232 "13.1.1.253" connected to the address space B of proxy device 23 that is the destination of LRQ packet (T70,T71), because H323 multi-media terminal 22 requested for the confirmation of the existence is being registered. In addition, then, in LCF packet, as IP address information of calling accepted terminal, IP address of H323 multi-media terminal 22 is contained.

Proxy device 23 which has received LCF packet from gate keeper 25 translates IP address "13.1.1.1" of H323 multi-media terminal 22 that is the address of calling accepted terminal which is in the received LCF packet, to IP address "10.1.1.253" of network interface 231 connected to address space A of proxy device 23. Besides, proxy device 23 translates the destination IP address "13.1.1.253" of LCF packet to IP address "10.1.1.200" of gate keeper 24, and the source IP address "13.1.1.200" of LCF packet to IP address "10.1.1.253" of network interface 231 connected to address space A of proxy device 23, then sends it to gate keeper 24 in address space A (T72,T73).

Gate keeper 24 which has received LCF packet from proxy device 23 refers to the IP address information of calling accepted terminal in LCF packet (IP address of network interface 231 connected to the address space A of proxy device 23), then sends ACF packet (admission confirm packet) toward H323 multi-media terminal 21 so as to inform H323 multi-media terminal 21 that is calling out terminal, of IP address information of this calling accepted terminal (T74,T75). In ACF packet, there is contained IP address information of calling accepted H323 multi-media terminal 22. H323 multi-media terminal 21 that is the calling out terminal which has received the ACF packet sends communication start packet toward IP address "10.1.1.253" of this calling accepted terminal (T76).

Proxy device 23 looks up IP address of destination multi-media terminal 22 from the received communication start packet which obeys to multi-media communication protocol. And this device automatically makes address corresponding table 13C (T77). After this, referring to this table, this device translates source address ("10.1.1.1"→"13.1.1.253") and destination address ("10.1.1.253"→"13.1.1.1") of the communication start packet (T78), and sends this packet toward the destination H323 multi-media terminal 22 (T79).

Multi-media terminal 22 which has received the communication start packet exchanges ARQ packet and ACF packet between gate keeper 25 (T80,T81). Thus, it informs gate keeper 25 that it is in the communication (joining in the communication).

After this, multi-media terminal 22 compiles and sends a reply packet for the communication start packet (T82,T83).

Upon receipt of this packet, referring to the address corresponding table compiled as mentioned above, proxy device 23 translates destination IP address ("13.1.1.253"→"10.1.1.1") and source IP address ("13.1.1.1"→"10.1.1.253") contained in the received reply packet's IP header and data area, according to the address corresponding of the table (T84). Then, it sends reply packet to address space A (which belongs to the network). This reply packet reaches to multi-media terminal 21 (T85).

After these processes, H323 multi-media terminal 21 in address space A and H323 multi-media terminal 22 in address space B process usual packet communication. In this communication, proxy device 23, receiving packets from multi-media terminal 21 or 22, translates all the IP address of the destination and the source contained in the received packet's IP header and data area according to the IP address corresponding of address corresponding table 13C, then sends it to the address space (which belongs to the network) of the destination.

Figure 9:
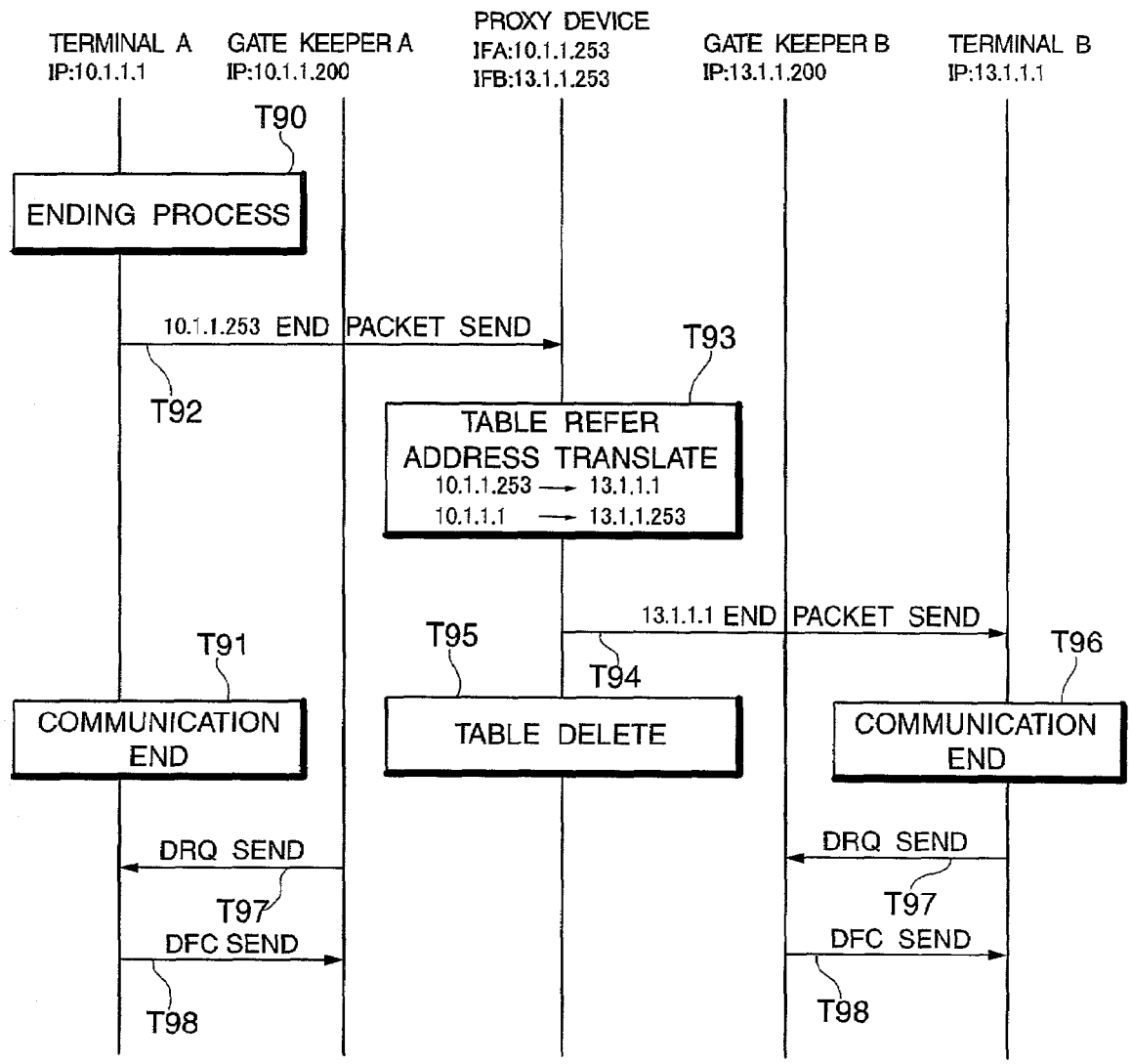
FIG. 9 is a sequence chart showing the operation of the calling and disconnecting from one multi-media terminal to the proxy device of the second embodiment; and from the proxy device to the other terminal.
Figure 10:
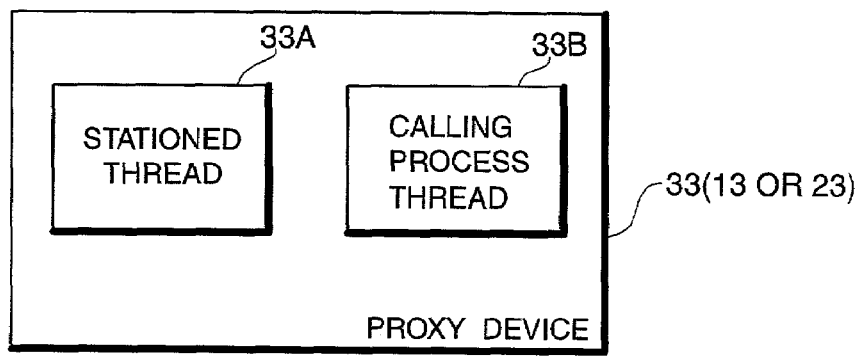
FIG. 10 is a block diagram showing the method to deal with callings from many terminals according to the other embodiment.
Figure 11:
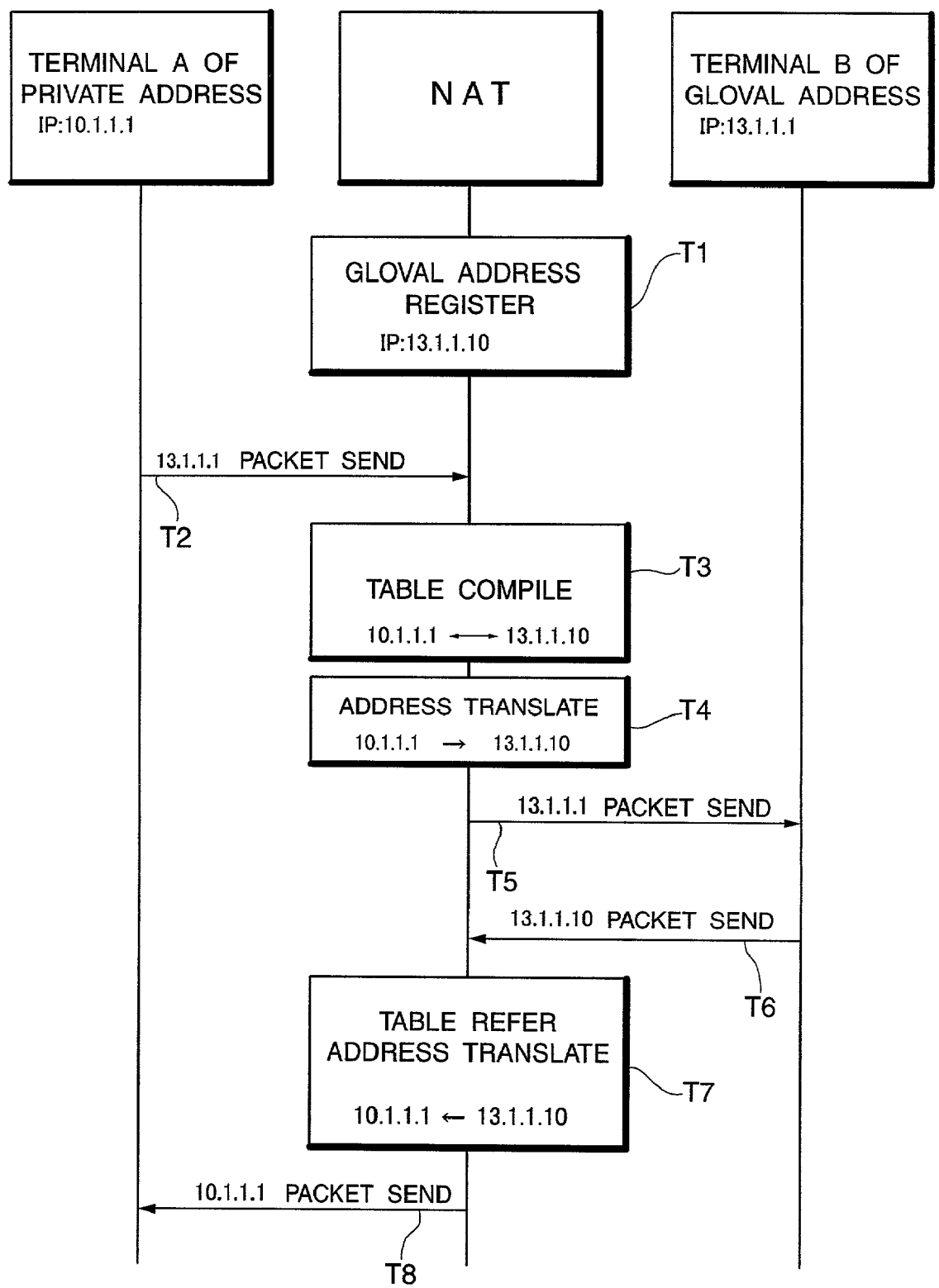
FIG. 11 is a sequence chart showing the translating operation about the IP address by NAT in the prior art.

FIG. 9 is a sequence chart showing the operation when the communication ends in the second embodiment.

As shown in FIG. 9, almost all the operation processes of this second embodiment are similar to those of the first embodiment (T90~T96, c.f. FIG. 3). The different point is that there are those additional processes that each H323 multi-media terminal 21, 22 exchange DRQ packet (disengage request packet) and DCF packet (disengage confirm packet) respectively with gate keeper 24, 25 (T97,T98), and make them recognize to end the communication.

In addition, the operation processes of priority control about connection processed by the priority controller (c.f. FIG. 1) of proxy device 23 in the second embodiment are similar to those of the first embodiment.

Moreover, the operation processes confirming address corresponding table processed by the table confirmer (c.f. FIG. 1) of proxy device 23 in the second embodiment are also similar to those of the first embodiment.

3. Effects of the Second Embodiment

As mentioned above, according to the second embodiment, when the communications are processed between all sorts of multi-media terminals kept by the different gate keepers respectively in each address space, the proxy device compiles an address corresponding table from the communication packets between gate keepers, and stands proxy for the communications between multi-media terminals existing in different address spaces. Consequently, the communications between multi-media terminals in different address spaces kept by different gate keeper (for example, H323 multi-media terminal), which was impossible by the conventional devices, has become possible.

Other effects are similar to those of the first embodiment.

<Other Embodiment>

As the number of connections increases, the number of processions about calling packets increases. So, as a result, the congestion of packets is expected to occur in the proxy device.

Now, hereinafter, it will be described how to prevent this congestion as the number of calling and connecting increased in proxy device 13, 23 of the first or second embodiment.

Proxy device 33 (13 or 23) is equipped a stationed thread 33A which is always operating in the operation of the system and a calling process thread 33B which operates calling procession at each time when calling is connected. A stationed thread 33A watches packets and compiles address corresponding table from the received packets. Calling process threads 33B execute calling control processes and data processes of packets to be media of convey news or other information.

When proxy device 33 has received a new calling and connecting packet, it renews the address corresponding table by stationed thread 33A and compiles a new calling process thread 33B for a new calling and connecting.

As above mentioned stationed thread 33A and calling process threads 33B are equipped, proxy device 33 can separate each procession of the each calling while it processes address corresponding table universally. Consequently, it can prevent the congestion of packets, if the number of calling and connecting became large.

While the present invention has been described in terms of the preferred embodiment, the invention is not to be limited thereto, but can be embodied in various ways without departing from the principle of the invention as defined in the appended claims. Moreover, it goes without saying that the proxy device above-mentioned is not only connected to the wired WAN, but also connected to the wireless WAN.

What is claimed is:

1. A network connecting method that processes communications between a first multi-media terminal having a first terminal address in a first address space and a second multi-media terminal having a second terminal address in a second address space, comprising the steps of:
  (a) providing a proxy device having a first proxy address in the first address space and a second proxy address in the second address space;
  (b) transmitting packets from the first multi-media terminal to the proxy device using the first terminal address as a source address and the first proxy address as a destination address in headers of the packets, the packets also including the second terminal address in data areas of the packets;
  (c) in the proxy device, modifying the packets received from the first terminal by translating the addresses in the headers and data areas of the packets, the source address being translated to the second proxy address and the destination address being translated to the second terminal address;
  (d) transmitting the packets modified in step (c) from the proxy device to the second multi-media terminal;
  (e) transmitting packets from the second multi-media terminal to the proxy device using the second terminal address as the source address and the second proxy address as the destination address in the headers of the packets and the first address in the data areas of the packets;
  (f) in the proxy device, modify the packets received from the second multi-media terminal by translating the addresses in the headers and data areas of the packets, the source address being translated to the first proxy address and the destination address being translated to the first terminal address; and
  (g) transmitting the packets modified in step (f) from the proxy device to the first multi-media terminal.

2. The network connecting method according to claim 1, further comprising
  in the proxy device, establishing a correspondence between the first terminal address and the second proxy address, and also establishing a correspondence between the second terminal address and the first proxy address before the address translations in steps (c) and (f).

3. The network connecting method according to claim 2, wherein the proxy device processes a confirmation of corresponding address according to characteristics of the packets.

4. The network connecting method according to claim 1, wherein the first multi-media terminal is an H323 multi-media terminal controlled by a first gate keeper in the first address space and the second multi-media terminal is an H323 multi-media terminal controlled by a second gate keeper in the second address space.

5. The network connecting method according to claim 4, wherein the first gate keeper in the first address space inquires of the second gate keeper in the second address space, when the first gate keeper receives a calling and connecting request for the H323 first multi-media terminal, by a process that comprises the steps of:
  translating, as the destination address, the first proxy address of the proxy device in the first address space to a second gate keeper address of the second gate keeper in the second address space, and
  translating, as the source address, a first gate keeper address of the first gate keeper in the first address space to the second proxy address of the proxy device in the second address space.

6. The network connecting method according to claim 1, wherein the proxy device processes a priority connection according to characteristics of the packets.

7. The network connecting method according to claim 6, wherein the proxy device processes a confirmation of corresponding addresses according to characteristics of the packets.

8. The network connecting method according to claim 1, further comprising the step of assigning priorities, in the proxy device, for transmission of packets according to characteristics of the packets.

9. The network connecting method according to claim 1, wherein the first address space is a private address space and the second address space is a global address space.

10. The network connecting method according to claim 1, wherein the first address space is an IPV4 address space and the second address space is an IPV6 address space.

11. A proxy device that has a first proxy address in a first address space and a second proxy address in a second address space, and that is used in a network connecting method that processes communications between a first multi-media terminal having a first terminal address in the first address space and a second multi-media terminal having a second terminal address in the second address space, the network connecting method including the steps of (a) transmitting packets from the first multi-media terminal to the proxy device using the first terminal address as a source address and the first proxy address as a destination address in headers of the packets, the packets also including the second terminal address in data areas of the packets; (b) in the proxy device, modifying the packets received from the first terminal by translating the address in the headers and data areas of the packets, the source address being translated to the second proxy address and the destination address being translated to the second terminal address; (c) transmitting the packets modified in step (b) from the proxy device to the second multi-media terminal; (d) transmitting packets from the second multi-media terminal to the proxy device using the second terminal address as the source address and the second proxy address as the destination address in the headers of the pockets and the first terminal address in the data areas of the packets; (e) in the proxy device, modify the packets received from the second multi-media terminal by translating the address in the headers and data areas of the packets, the source address being translated to the first proxy address and the destination address being translated to the first terminal address; and (f) transmitting the packets modified in step (e) from the proxy device to the first multi-media terminal, wherein said proxy device comprises:

an address translator that translates the addresses in the headers and data areas of packets received from the first multi-media terminal and that translates the addresses in the headers and data areas of packets received from the second multi-media terminal; and a priority controller which processes a priority connection according to characteristics of the packets.

12. The proxy device according to claim 11, further comprising:

an automatic table compiler to compile an address corresponding table that correlates the first terminal address of the first multi-media terminal in the first address space with the second terminal address of the proxy device in the second address space, and that also correlates the second terminal address of the second multi-media terminal in the second address space with the first terminal address of the proxy device in the first address space, to permit said address translator to translate the addresses in accordance with said address corresponding table when packets are sent or received.

13. The network connecting proxy device according to claim 12 wherein said automatic table compiler compiles address correspondences in said address corresponding table for communication between at least one further multi-media terminal in the first address space and at least one further multi-media terminal in the second address space.

14. The network connecting proxy device according to claim 12 wherein said automatic table compiler deletes address correspondences for the each communication, when the communication ends.

15. The proxy device according to claim 11,
wherein the first multi-media terminal is an H323 multi-media terminal controlled by a first gate keeper in the first address space and the second multi-media terminal is an H323 multi-media terminal controlled by a second gate keeper in the second address space.

16. The proxy device according to claim 11,
wherein the address translator translates, as a the destination address, the first proxy address of the proxy device in the first address space to a second gate keeper address of the second gate keeper in the second address space, and translates, as a the source address, a first gate keeper address of the first gate keeper in the first address space to the second proxy address of the proxy device in the second address space.

17. The proxy device according to claim 11, further comprising a table confirmer which processes a confirmation of corresponding addresses according to characteristics of the packets.

18. The proxy device according to claim 17, further comprising a stationed thread which watches packets and compiles said address corresponding table from the received packets.

19. The proxy device according to claim 11, further comprising a stationed thread which watches packets and compiles said address corresponding table from the received packets.

* * * * *